United States Patent [19]

Nakamura

[11] Patent Number: 4,987,552
[45] Date of Patent: Jan. 22, 1991

[54] AUTOMATIC VIDEO EDITING SYSTEM AND METHOD

[76] Inventor: Fumiko Nakamura, 2-22-20 Sanno Ota-Ku, Tokyo, Japan

[21] Appl. No.: 153,379

[22] Filed: Feb. 8, 1988

[51] Int. Cl.⁵ ............................................ G06F 15/46
[52] U.S. Cl. ..................................... 364/521; 358/335; 364/523
[58] Field of Search ............... 364/518, 521, 522, 523, 364/413.19, 413.22, 419, 474.05, 474.23, 474.24, 474.25, 186, 192, 193; 358/93, 335, 107, 83, 76, 903; 340/720, 721

[56] References Cited

U.S. PATENT DOCUMENTS

| | | | |
|---|---|---|---|
| 4,527,193 | 7/1985 | St. John et al. | 358/76 |
| 4,660,101 | 4/1987 | Martin | 358/335 X |
| 4,731,743 | 3/1988 | Blancato | 364/521 |
| 4,754,342 | 6/1988 | Duffy | 358/335 X |
| 4,845,634 | 7/1989 | Vitek et al. | 364/474.24 X |

Primary Examiner—Dale M. Shaw
Assistant Examiner—H. R. Herndon
Attorney, Agent, or Firm—Edwin E. Greigg

[57] ABSTRACT

Automatic editing equipment for a video tape pertaining to the makeup methods includes a memory medium receiving unit connected to a central processing unit and for receiving a plurality of memory media set every respective items or devisions of at least shape of face, eye, nose and mouth so as to cover features or looks of various persons and in which makeup methods are memorized in correspondence with various specifications in the respective items or divisions. A makeup method select circuit connected to the memory medium receiving unit makes comparisons between signals on the side of input information related to the form of face from individual customers and signals on the side of the memory medium receiving unit, thus to select makeup methods conforming to the input information from those in the plurality of memory media and combine them with each other. A video tape recorder is connected to the makeup method select circuit to automatically edit a video tape of the makeup method most suitable for each customer.

18 Claims, 1 Drawing Sheet

AUTOMATIC VIDEO EDITING SYSTEM AND METHOD

BACKGROUND OF THE INVENTION

This invention relates to a method and apparatus for quickly and inexpensively automatically editing and recording personal makeup videos customized to the specific makeup needs of an individual. More particularly, the present system and method utilizes a computer along with stored, selectable video makeup segments to produce personal makeup videos which are tailored to the makeup needs of the individual users.

In the past, it has not been a conventional practice to video record makeup instructions personalized to individual customers and sell those recordings to the customers for their personal use.

Women have generally learned their particular makeup habits in various ways, such as from female relatives and peer group, magazine articles, or when purchasing cosmetics. However, since such instructions in makeup methods are usually given by one who has only developed techniques for their particular features, or on a model as the makeup subject, the instructions cannot be personalized to each individual. Accordingly, there frequently arises requests for makeup instruction tailored to the individual's specific makeup needs.

SUMMARY OF THE INVENTION

With the above in mind, an object of this invention is to provide equipment to automatically edit and record personal makeup videos which are customized to the needs of a particular individual. Each such video contains the professional makeup methods most suited to the features of the individual for which the video was created.

Another object of this invention is to provide equipment to automatically edit and record video information by making use of a computer so that mass production of customized, personal videos can be achieved, thus making it possible to provide personal video recordings quickly and at a reasonable cost.

A further object of this invention is to provide an automatic editing and recording system in which previously recorded video segments are stored dealing with recommended makeup techniques corresponding to various finely classified categories of facial characteristics, such as shape of face, hairstyle, color of skin or complexion, eyes, eyebrows, nose, mouth, etc., so that when particular information about subcategories of these facial characteristics for a particular individual is fed into the computer, an output video can be automatically edited and recorded from selected ones of the pre-stored video segments, so that the final product video is a makeup presentation optimally tailored to the needs of the individual user, and each user can obtain a video specifically directed at their detailed facial characteristics. If the correct information is fed into the computer, a video output of uniform quaity is obtained. This makes it possible to supervise the quality of the product and to improve the level of the quality.

To achieve these objectives, in accordance with the present invention, there is provided a method and system for automatically editing and recording a video tape to contain a personalized make-up method. The system includes a memory medium holding unit connected to a computer, the holding unit receiving a plurality of pre-recorded memory media in which makeup methods are stored corresponding to categories of facial features such as shape of face, eyes, nose, mouth, etc. A makeup method select circuit is connected to the memory medium holding unit and also to the computer for comparing input information signals corresponding to the facial characteristics of the user with signals from the memory medium holding unit to select makeup methods corresponding to the input data from the pre-recorded segments stored in the plurality of memory media and combine these segments with each other. A video tape recorder connected to the makeup method select circuit automatically edits and records the segments selected to produce a complete video tape containing the makeup methods most suitable to the features of the user.

BRIEF DESCRIPTION OF THE DRAWING

The figure is a block diagram showing one embodiment of the invention.

DETAILED DESCRIPTION OF THE PREFERRED EMBODIMENT

Figure 1:
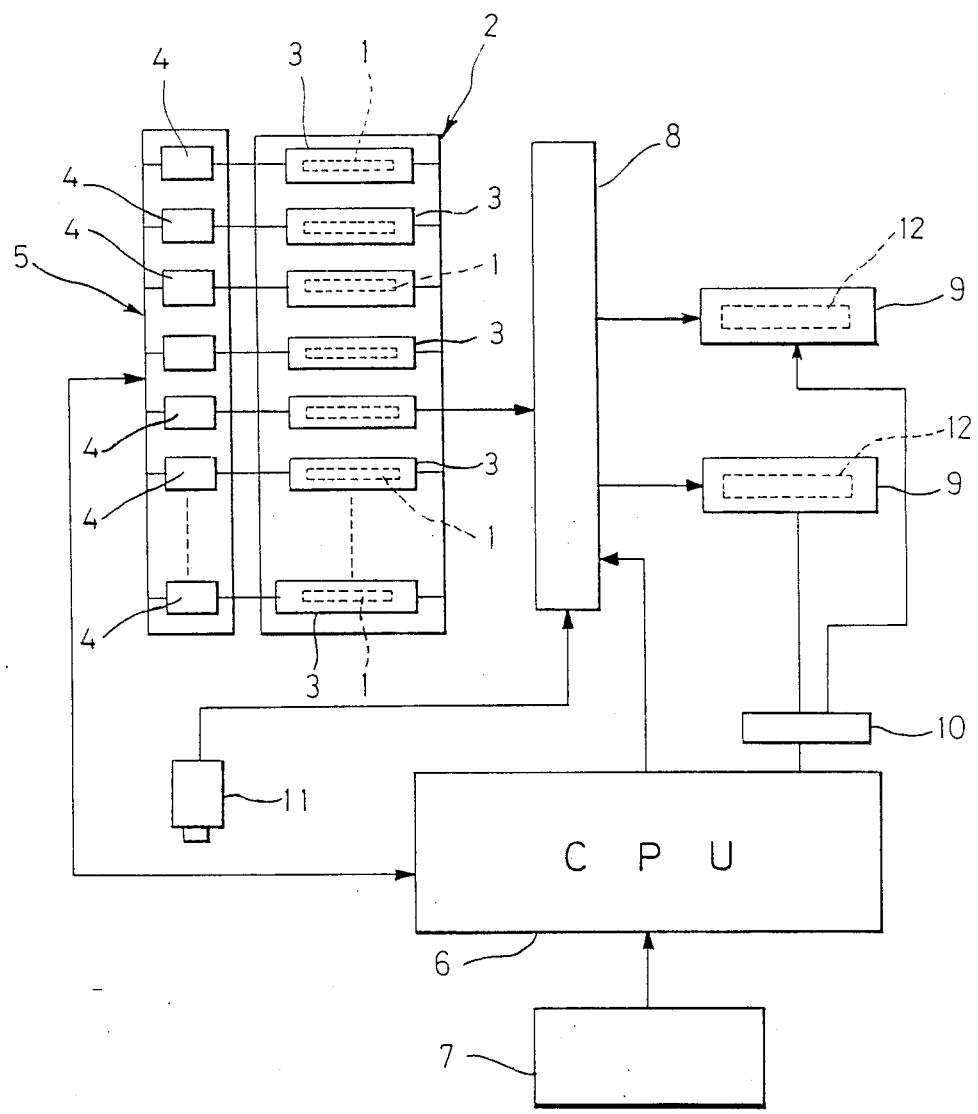

In the figure, reference numeral 1 denotes a plurality of video memory or storage media for each category of facial characteristics or features important in choosing proper makeup procedures, such as shape of face, hairstyle, color of skin or complexion, eyes, eyebrows, nose, mouth, etc. The range of these features will cover the facial characteristics of potential users. Various makeup techniques and hints corresponding to subcategories for each characteristic category are stored in the video memory media. For example, with respect to the shape of a face, subcategories for round, egg-shaped, square, etc. each calls for a different technique of makeup. Different combinations of characteristics may also call for special makeup procedures. These video memory or storage media may be discs, tapes, or other storage media.

Reference numeral 2 denotes a memory or storage holding unit including a plurality of storage media handling or drive devices 3, which are designed to hold the above-described plurality of memory media 1. A control unit 5, which includes a plurality of controllers 4, is connected to the memory holding unit 2 to control the plurality of memory or storage media handling devices 3. Reference numeral 6 denotes the central processing unit or control processing unit of a computer, to which a user input data generator 7 is connected. Information concerning characteristics of individual users is entered into the generator 7. For example, information related to a user's face shape may be input into this generator. This information may be obtained, for example, through an interview with the customer, a questionnaire, or photographs. The CPU 6 implements any necessary processing of the basic input data, and the memory medium holding unit 2 is connected to the CPU 6 through control unit 5.

A makeup method select circuit 8 provided between the CPU 6 and the memory medium holding unit 2 makes comparisons between signals representing input information and signals from the memory medium holding unit to select appropriate makeup methods or techniques from those stored in the memory media 1 which are in harmony with the input information and combine those selected makeup methods or techniques with each other.

Reference numeral 9 denotes video recorders, each connected to the makeup method select circuit 8 to automatically receive pre-recorded video segments from select circuit 8 and record the properly edited makeup method video. In the embodiment shown, two recorders are controlled by the CPU through an interface unit 10. In addition, reference numeral 11 denotes a video camera which can be used to input video information about the features of a user to the video tape 12 by using VTR 9.

As just described, when information about the user which includes the user's wishes as well as diagnostic information concerning characteristics of the user, e.g. form of face, etc. is obtained from interviews, photos, etc. and is input into the system, a video can be automatically edited and recorded from video segments stored in the system and the resulting video will contain proper makeup methods personalized to the specific features of the individual user. This video will take into consideration all the characteristics, such as shape of face, eyes, nose, mouth, etc., as well as the wishes and demands of the user.

As is clear from the foregoing description, the invention provides a new, fast, inexpensive method and system for massproducing custom videos. Since each resulting video has been automatically edited and recorded to contain the optimum makeup method for each individual, it is possible to provide personalized merchandise to customers as inexpensively and efficiently as possible. The pre-stored video segments can be automatically selected and combined depending upon the particular characteristics of potential users, so the quality of the final complete makeup video can be uniformly maintained and supervised. That quality can also easily be improved, for example, by increasing the number and breadth of the individual characteristics for the classification system. Further, since customers can obtain personal makeup videos tailored to their specific features, they will receive makeup hints, techniques and warnings which are directed to their particular needs, wishes and conditions.

The foregoing relates to a preferred exemplary embodiment of the invention, it being understood that other variants and embodiments thereof are possible within the spirit and scope of the invention, the latter being defined by the appended claims.

REFERENCE NUMERAL TABLE

1 . . . Memory medium,
2 . . . Memory medium receiving unit,
3 . . . Memory medium receiving circuit,
4 . . . Controller,
5 . . . Control unit,
6 . . . CPU,
7 . . . Data generator,
8 . . . Makeup select circuit,
9 . . . VTR,
10 . . . Interface Unit,
11 . . . Video camera
12 . . . Video tape

What is claimed is:

1. An automatic editing and recording system for producing personalized video tapes pertaining to makeup methods, said system comprising:
   a control means;
   a memory medium holding unit connected to said control means for holding at least one memory medium, said memory medium containing a plurality of video segments each depicting makeup methods, said video segments classified into categories corresponding to possible variations of the respective facial features of persons including at least shape of face, eyes, nose and mouth, wherein each said category is divided into subcategories corresponding to possible variations of said respective facial features;
   a makeup method select means connected to said memory medium holding unit and to said control means to receive from said control means signals relating to the facial features of a particular person and, in accordance with those signals, to select various ones of said plurality of video segments; and
   a video recorder connected to said makeup method select means to automatically record an edited, personalized video containing copies of the selected video segments depicting makeup methods.

2. The automatic recording system of claim 1, wherein said category shape of face includes at least the subcategories of round, egg-shaped and square.

3. An automatic editing and recording system for producing customized videos, said system comprising:
   a control means;
   a memory medium unit connected to said control means for holding at least one memory medium, said memory medium containing a plurality of recorded video information segments divided into categories of information corresponding to various classifications of said information, wherein at least some of said categories are divided into subcategories of information corresponding to possible variations of said categories of information;
   an information select means connected to said memory medium holding unit and to said control means to receive signals from said control means related to specifically desired subcategories of information and, in accordance with those signals, to select various ones of said plurality of recorded video information segments; and
   a video recorder connected to said information select means to automatically record an edited, customized video containing the selected recorded video information segments.

4. The automatic recording system of claim 3, wherein said recorded video information segments contain makeup methods appropriate for particular facial characteristics.

5. The automatic recording system of claim 4, wherein said categories of information correspond to facial characteristics of persons including at least shape of face, eyes, nose and mouth.

6. The automatic recording system of claim 5, wherein said category of shape of face includes at least the subcategories of round, egg-shaped and square.

7. A method for automatically producing customized video material, said method comprising:
   storing on at least one storage medium a plurality of video information segments divided into categories of information corresponding to various classifications of said information segments, wherein at least some of said categories are divided into subcategories of information segments corresponding to possible variations of said categories of information;
   inputting to a data input device specific data concerning specific ones of said categories and subcategories of said stored video information segments;

selecting, in accordance with said input data, certain ones of said video information segments; and producing customized video material which selectively contains said selected information segments in accordance with said input data.

8. The method of claim 7, wherein the produced customized video material is a video recording.

9. The method of claim 8, wherein the video recording is a video tape.

10. The method of claim 8, wherein the video recording is a video disc.

11. The method of claim 8, wherein the video recording depicts makeup methods.

12. The method of claim 11, wherein said categories of information correspond to the facial features of persons.

13. The method of claim 12, wherein said categories include at least shape of face, eyes, nose and mouth.

14. The method of claim 13, wherein said category of shape of face includes at least subcategories of round, egg-shaped and square.

15. An automatic video editing and recording system for producing informative personalized video, said system comprising:

a storage means for storing a plurality of pre-recorded motion video segments showing characters demonstrating useful techniques, said segments classified into categories corresponding to various characteristics of human beings;

a data input means for inputting a plurality of specific data related to said various characteristics as found in a particular human being;

a select means for receiving said plurality of specific input data to select certain ones of said plurality of prerecorded video segments in accordance with said plurality of specific input data; and video recorder means for receiving said selected certain ones of said plurality of video segments and recording them sequentially on a video medium to produce a customized, personalized informative video which contains the selected video segments while not containing the non-selected video segments.

16. The automatic video editing and recording system of claim 15 wherein said classified pre-recorded video segments are further classified into sub-categories corresponding to various characteristics of human beings.

17. The automatic video editing and recording system of claim 16 wherein said select means selects at least one of said plurality of pre-recorded video segments from each of said subcategories.

18. The automatic video editing and recording system of claim 15 wherein said select means selects at least one of said plurality of pre-recorded video segments from each of said categories.

* * * * *